US012806785B2

(12) United States Patent
Zimmerman et al.

(10) Patent No.: US 12,806,785 B2
(45) Date of Patent: Nov. 24, 2026

(54) SYSTEM FOR HANDLING ELECTRICAL COMPONENTS FOR VEHICLE

(71) Applicant: Ford Global Technologies, LLC, Dearborn, MI (US)

(72) Inventors: Jon Arthur Zimmerman, Ferndale, MI (US); Zachary James Kadykowski, Chelsea, MI (US); Kurt Michael Lundeen, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 101 days.

(21) Appl. No.: 18/909,203

(22) Filed: Oct. 8, 2024

(65) Prior Publication Data

US 2026/0097510 A1 Apr. 9, 2026

(51) Int. Cl.

*B60R 21/00* (2006.01)
*B25J 9/16* (2006.01)
*B60R 16/023* (2006.01)

(52) U.S. Cl.

CPC ........... *B25J 9/1687* (2013.01); *B25J 9/1664* (2013.01); *B60R 16/023* (2013.01)

(58) Field of Classification Search

CPC ...... B25J 9/1687; B25J 9/1664; B60R 16/023
See application file for complete search history.

(56) References Cited

U.S. PATENT DOCUMENTS

| | | | | |
|---|---|---|---|---|
| 11,673,264 | B2 * | 6/2023 | Nikovski | B25J 9/1664 700/246 |
| 12,030,185 | B2 * | 7/2024 | Kerrick | B25J 9/1687 |
| 12,194,635 | B2 * | 1/2025 | Rabindran | B25J 9/1607 |
| 2023/0364803 | A1 * | 11/2023 | Narita | B25J 19/023 |
| 2023/0405817 | A1 * | 12/2023 | Saadat Dehghan | B25J 9/1638 |
| 2026/0097522 | A1 | 4/2026 | Kadykowski et al. | |
| 2026/0097524 | A1 | 4/2026 | Lundeen et al. | |

(Continued)

OTHER PUBLICATIONS

Mcmorran, et al., Adapting a Low-Cost Selective Compliant Articulated Robotic Arm for Spillage Avoidance, Journal of Laboratory Automation, 2016, pp. 799-805, vol. 21(6), Society for Laboratory Automation and Screening, Sage Publications, 2016.

(Continued)

*Primary Examiner* — Dalena Tran
(74) *Attorney, Agent, or Firm* — Burris Law, PLLC

(57) ABSTRACT

A system for handling electrical components of a vehicle includes a fixture, a vehicle component, a robot, a guiding apparatus and a controller. The fixture includes at least one module having a terminal. The vehicle component is coupled to the fixture and includes an electrical connector. The guiding apparatus is movable between a first position in which the guiding apparatus is disengaged with the module and a second position in which the guiding apparatus is engaged with the module. The guiding apparatus defines an opening that includes a shape that corresponds to the shape of the terminal. The controller is configured to instruct the robot to grasp the electrical connector based on data received, move the guiding apparatus to the second position, and instruct the robot to connect the electrical connector to the terminal. The electrical connector extending through the opening of the guiding apparatus to connect to the terminal.

20 Claims, 14 Drawing Sheets

(56) References Cited

U.S. PATENT DOCUMENTS

| | | | |
|---|---|---|---|
| 2026/0097722 | A1 | 4/2026 | Zimmerman et al. |
| 2026/0097723 | A1 | 4/2026 | Kadykowski et al. |
| 2026/0103152 | A1 | 4/2026 | Negrus et al. |

OTHER PUBLICATIONS

She, et al., Cable Manipulation with a Tactile-Reactive Gripper, Jun. 23, 2020, 9 pages, doi arXiv:1910.02860v3.

Huang, et al., Fault-tolerant Mating Process of Electric Connectors in Robotic Wiring Harness Assembly Systems, Proceedings of the 7th World Congress on Intelligent Control and Automation, China, Jun. 25-27, 2008, pp. 2339-2344, IEEE, 2008.

* cited by examiner

SYSTEM FOR HANDLING ELECTRICAL COMPONENTS FOR VEHICLE

FIELD

The present disclosure relates to a system for handling electrical component for a vehicle.

BACKGROUND

The statements in this section merely provide background information related to the present disclosure and may not constitute prior art.

Industrial robots have been used for a variety of manufacturing operations, including by way of example, welding, placement of parts for subsequent fabrication or assembly operations, and moving parts from one location to another such as retrieving parts from a storage location and moving them to an assembly station. Automating the moving of some vehicle parts such as wire harnesses, for example, may be challenging because of the lack of proper handling of the part and mechanical repeatability.

These issues related to automating the handling of components, among other issues related to processing the components, are addressed by the present disclosure.

SUMMARY

This section provides a general summary of the disclosure and is not a comprehensive disclosure of its full scope or all of its features.

In one form, the present disclosure provides a system for handling electrical components of a vehicle. The system includes a fixture, a vehicle component, at least one robot, a guiding apparatus, and a controller. The fixture includes at least one module coupled thereto. The module includes a first terminal. The vehicle component is coupled to the fixture and includes a first electrical connector. The guiding apparatus is movable between a first position in which the guiding apparatus is disengaged with the module and a second position in which the guiding apparatus is engaged with the module to inhibit movement of the module. The guiding apparatus defines a first opening that includes a shape that corresponds to the shape of the first terminal of the module. The first opening surrounds the first terminal in response to the guiding apparatus being moved to the second position. The controller is in communication with the robot and the guiding apparatus. The controller is configured to: instruct the robot to grasp the first electrical connector based on data received, move the guiding apparatus to the second position, and instruct the robot to connect the first electrical connector to the first terminal of the module. The first electrical connector extends through the first opening of the guiding apparatus to connect to the first terminal.

In variations of the system of the above paragraph, which can be implemented individually or in any combination: the controller is configured to move the guiding apparatus from the second position to the first position in response to the first electrical connector being connected to the first terminal; the guiding apparatus includes a first member and a second member, the first member and the second member are spaced apart from each other when the guiding apparatus is in the first position and engaged with each other to define the first opening when the guiding apparatus is in the second position; an actuator assembly is coupled to the guiding apparatus and configured to move the guiding apparatus between the first position and the second position; the vehicle component includes a rigid wire harness body, the first electrical connector is coupled to the rigid wire harness body prior to the robot grasping the first electrical connector; the module is removably coupled to the fixture; the vehicle component includes a rigid wire harness body and a collar secured to the rigid wire harness body, the first electrical connector is coupled to the collar prior to the robot grasping the first electrical connector; the module includes a second terminal; the guiding apparatus defines a second opening that includes a shape that corresponds to the shape of the second terminal of the module, the second opening surrounds the second terminal in response to the guiding apparatus being moved to the second position; the vehicle component includes a second electrical connector; the controller is configured to instruct the robot to connect the second electrical connector to the second terminal of the module after the first electrical connector is connected to the first terminal, the second electrical connector extends through the second opening of the guiding apparatus to connect to the second terminal; and the module includes a plurality of modules.

In another form, the present disclosure provides a system for handling electrical components of a vehicle. The system includes a fixture, a vehicle component, at least one robot, a guiding apparatus, and a controller. The fixture includes at least one module coupled thereto. The module includes a first terminal. The vehicle component is coupled to the fixture to form a structure and includes a first electrical connector. The guiding apparatus is movable between a first position in which the guiding apparatus is disengaged with the module and a second position in which the guiding apparatus is engaged with the module to inhibit movement of the module. The guiding apparatus defines a first opening that includes a shape that corresponds to the shape of the first terminal of the module. The first opening surrounds the first terminal in response to the guiding apparatus being moved to the second position and includes an insertion region and a connecting region. The insertion region has an area that is greater than an area of the connecting region. The controller is in communication with the robot and the guiding apparatus. The controller is configured to: instruct the robot to grasp the first electrical connector based on data received, move the guiding apparatus to the second position, and instruct the robot to connect the first electrical connector to the first terminal of the module. The first electrical connector extends through the first opening of the guiding apparatus to connect to the first terminal.

In variations of the system of the above paragraph, which can be implemented individually or in any combination: the insertion region narrows toward the connecting region; the robot includes a first robot and a second robot, the first robot connects the first electrical connector to the first terminal and the second robot moves the structure after the first robot connects the first electrical connector to the first terminal; the controller is configured to move the guiding apparatus from the second position to the first position in response to the first electrical connector being connected to the first terminal; the guiding apparatus includes a first member and a second member, the first member and the second member are spaced apart from each other when the guiding apparatus is in the first position and engaged with each other to define the first opening when the guiding apparatus is in the second position; an actuator assembly coupled to the guiding apparatus and configured to move the guiding apparatus between the first position and the second position; the vehicle component includes a rigid wire harness body, the first electrical connector is coupled to the rigid wire harness body prior to the robot grasping the first electrical connector; the vehicle component includes a rigid wire harness body and a collar secured to the rigid wire harness body, the first electrical connector is coupled to the collar prior to the robot grasping the first electrical connector; and the module includes a plurality of modules.

In yet another form, the present disclosure provides a system for handling electrical components of a vehicle. The system includes a fixture, a vehicle component, at least one robot, a guiding apparatus, and a controller. The fixture includes at least one module coupled thereto. Each module includes a first terminal and a second terminal. The vehicle component is coupled to the fixture to form a structure. The vehicle component includes a rigid wire harness body, a first electrical connector and a second electrical connector. The first and second electrical connectors coupled to the rigid wire harness body. The guiding apparatus is movable between a first position in which the guiding apparatus is disengaged with one of the modules and a second position in which the guiding apparatus is engaged with the one module to inhibit movement of the module. The guiding apparatus defines a first opening and a second opening each including a shape that corresponds to the shape of the first terminal and the second terminal of the module. The first opening surrounds the first terminal in response to the guiding apparatus being moved to the second position and the second opening surrounds the second terminal in response to the guiding apparatus being moved to the second position. Each of the first and second openings includes an insertion region and a connecting region. The insertion region has an area that is greater than an area of the connecting region. The controller is in communication with the robot and the guiding apparatus. The controller is configured to: instruct the robot to grasp the first electrical connector based on data received, move the guiding apparatus to the second position, instruct the robot to connect the first electrical connector to the first terminal of the module. The first electrical connector extends through the first opening of the guiding apparatus to connect to the first terminal, instruct the robot to grasp the second electrical connector, instruct the robot to connect the second electrical connector to the second terminal, the second electrical connector extends through the second opening of the guiding apparatus to connect to the second terminal, move the guiding apparatus from the second position to the first position in response to the first electrical connector being connected to the first terminal and the second electrical connector being connected to the second terminal, and instruct the robot to move the structure after the first electrical connector is connected to the first terminal and the second electrical connector is connected to the second terminal.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
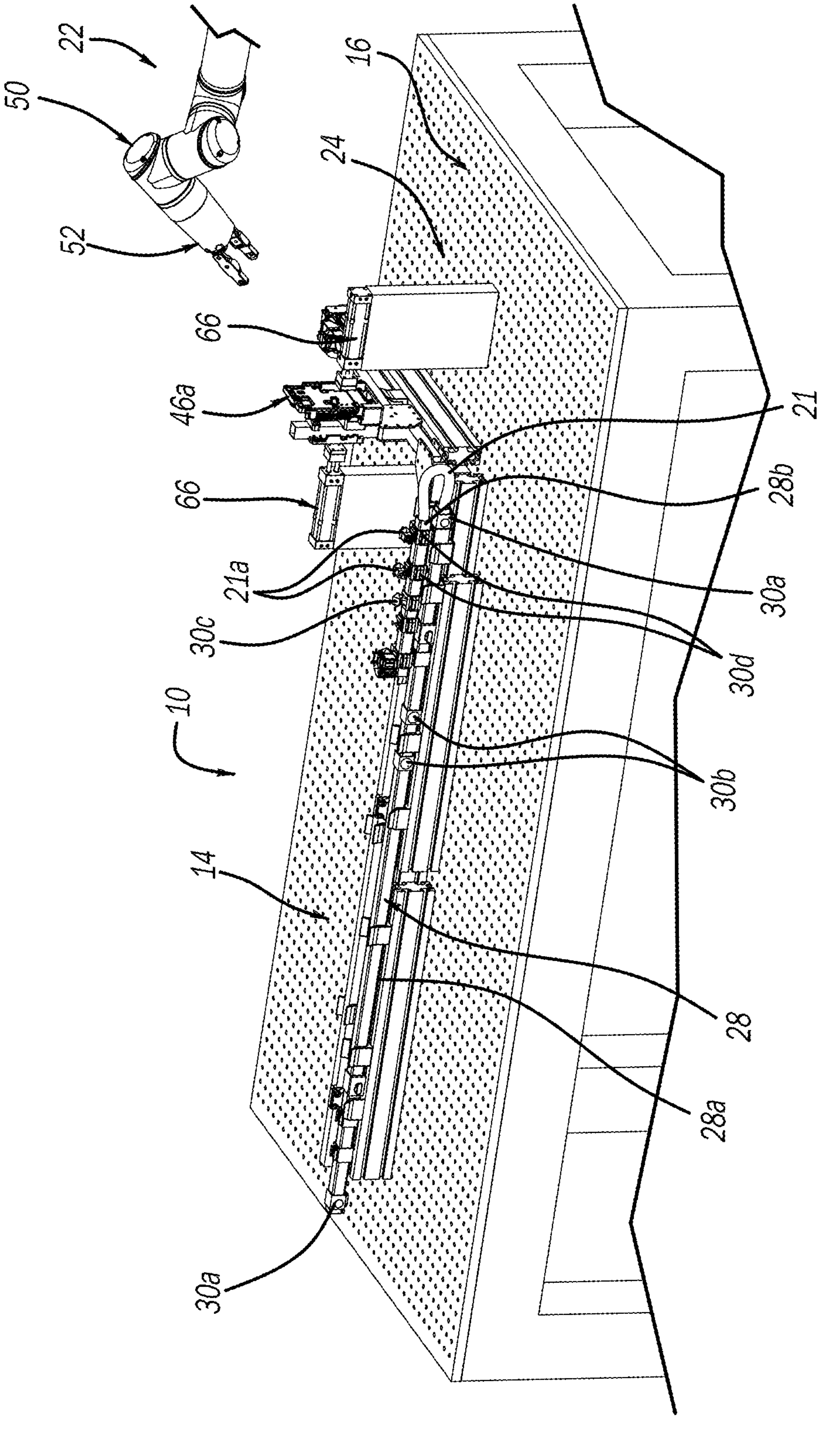
FIG. 1 is a perspective view of a system for handling components of a vehicle according to the principles of the present disclosure with a guiding apparatus of the system in a stowed position and a wire harness component of the system being disposed on a work surface.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, a system 10 for handling vehicle components 12 is illustrated. The handling of the vehicle components 12 may include retrieving the vehicle components 12 from a part support (e.g., a dunnage rack), manipulating the vehicle components 12, placing the vehicle components 12 onto a work surface 16, installing electrical connectors onto vehicle modules on the work surface 16 and/or installing the vehicle component 12 into a machine (e.g., a vehicle). The system 10 allows for the handling of the vehicle components 12 with little to no human intervention. In this way, the handling of the vehicle components 12 may be automated to increase productivity, reduce cycle time, and reduce variation and error, for example. In the example illustrated, the vehicle components 12 include electrical components such as wire harnesses. That is, wire harnesses tend to be flexible, complex, and highly variable from one part to the next, so that installation of the wire harness into the machine may be challenging to automate. The system 10 of the present disclosure provides for the adaptation of vehicle components 12 such as wire harnesses and the objects the vehicle components 12 interface with to better support automation. It should be understood that the vehicle components 12 may be other components of a vehicle other than wire harnesses.

Figure 2:
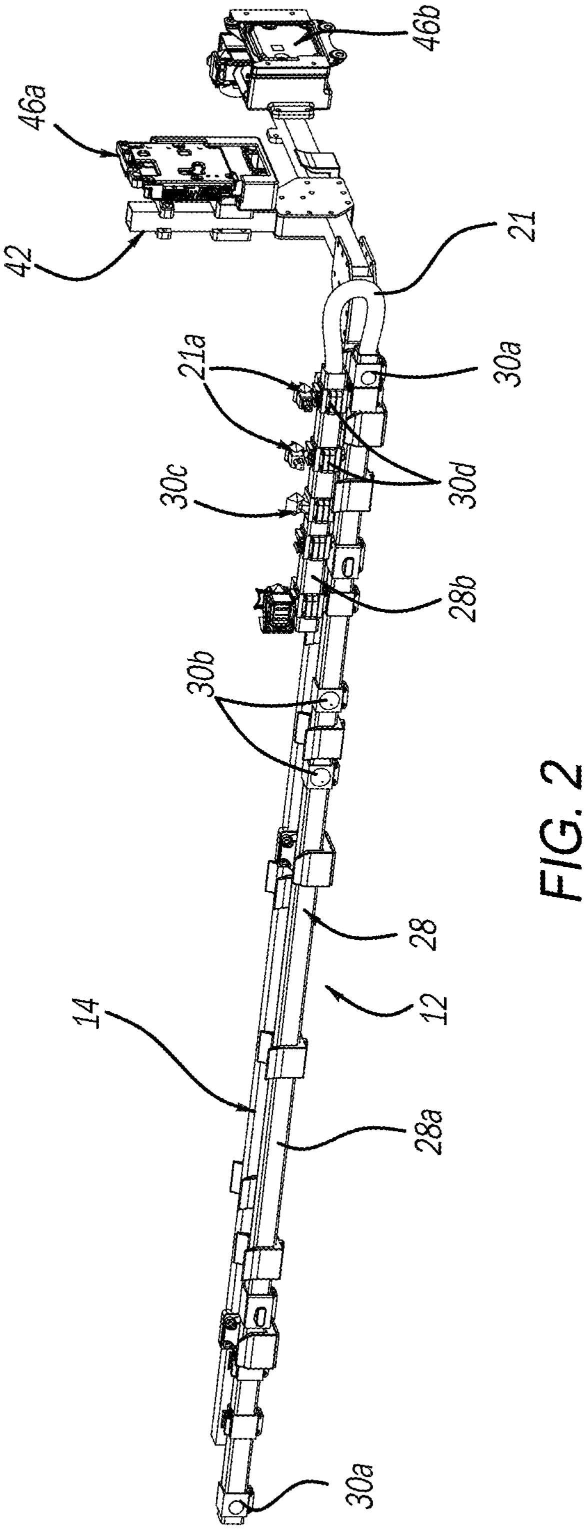
FIG. 2 is a perspective view of a wire harness component shown in FIG. 1 secured to a fixture of the system.
Figure 6:
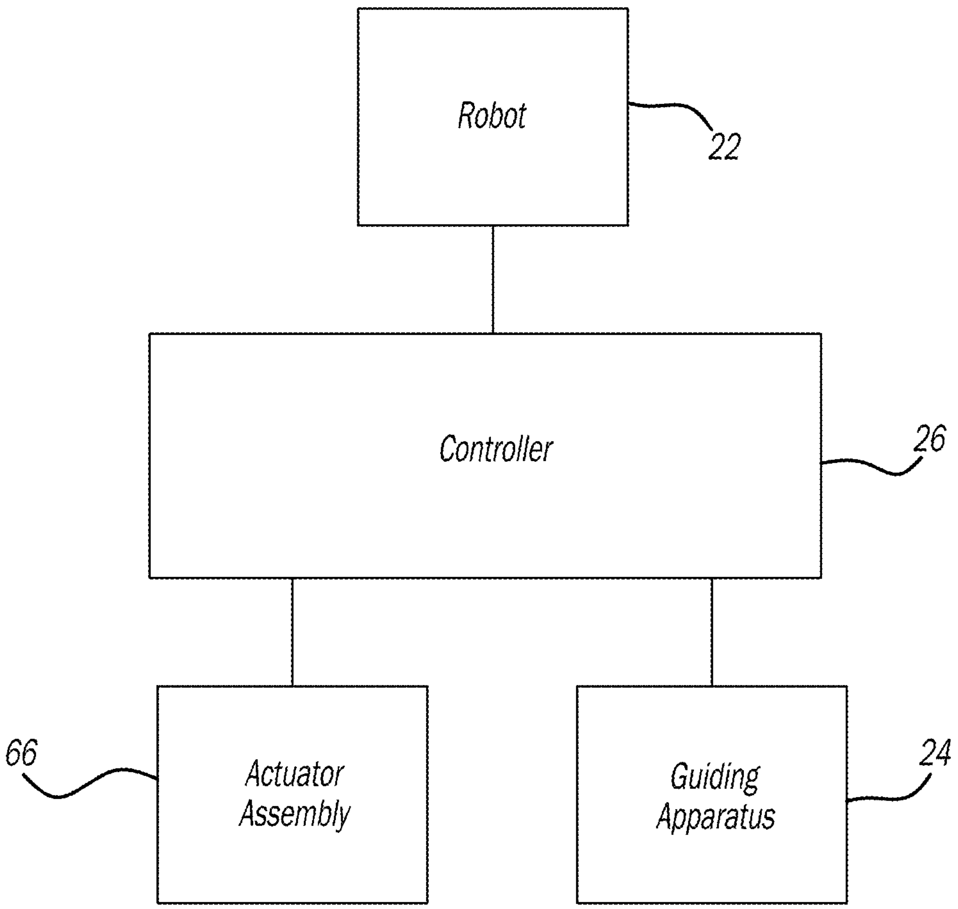
FIG. 6 is a schematic block diagram showing components of the system of FIG. 1 in accordance with the teachings of the present disclosure.

With reference to FIG. 1, the system 10 may include the vehicle components 12 (only one shown in the figures), a fixture 14, one or more robots 22, at least one guiding apparatus 24, and a controller 26 (FIG. 6). Each vehicle component 12 may be moved to the fixture 14 from the part support (not shown). One example of a system for moving the vehicle component 12 from the part support to the fixture 14 is disclosed in U.S. patent application Ser. No. 18/909,210, filed on Oct. 8, 2024, and titled "SYSTEM FOR HANDLING A COMPONENT OF A VEHICLE" which is commonly owned with the present application and the contents of which are incorporated herein by reference in its entirety. With reference to FIGS. 1 and 2, each vehicle component 12 includes a body or housing 28 and a plurality of collars 30*a*, 30*b*, 30*c*, 30*d*. The body 28 may be made of a rigid material (e.g., metal or plastic) and may house electrical components 21 (e.g., flexible wires). In the example illustrated, the body 28 is hollow and has a square shape. In some forms, the body 28 may have a circular shape, rectangular shape, or any other suitable shape that may be house electrical components. One example of the body 28 is disclosed in U.S. patent application Ser. No. 18/909,197, filed Oct. 8, 2024, and titled "METHOD AND SYSTEM FOR INSTALLING WIRING HARNESS INTO VEHICLE" which is commonly owned with the present application and the contents of which are incorporated herein by reference in its entirety.

The collars 30*a* may be coupled at opposing ends of section 28*a* of the body 28 of the vehicle component 12 and may be configured to attach the vehicle component 12 to the part support (not shown). One example of such collar is disclosed in U.S. patent application Ser. No. 18/909,210, filed on Oct. 8, 2024, and titled "SYSTEM FOR HANDLING A COMPONENT OF A VEHICLE" which is commonly owned with the present application and the contents of which are incorporated herein by reference in its entirety. The collars 30*b* may be coupled to the section 28*a* of the body 28 of the vehicle component 12 between the collars 30*a* and may be configured to allow a robot (not shown) to grasp the vehicle component 12 for moving from the part support to the fixture 14. One example of such collar is disclosed in U.S. patent application Ser. No. 18/909,210, filed on Oct. 8, 2024, and titled "SYSTEM FOR HANDLING A COMPONENT OF A VEHICLE" which is commonly owned with the present application and the contents of which are incorporated herein by reference in its entirety.

One or more collars 30*c* may be coupled to section 28*b* of the body 28 of the vehicle component 12 and may be configured to allow the robot 22 to grasp the section 28*b* of the vehicle component 12 and decouple the section 28*b* from the section 28*a*. One example of such collar is disclosed in U.S. patent application Ser. No. 18/909,193, filed on Oct. 8, 2024, and titled "SYSTEM FOR HANDLING ELECTRICAL COMPONENTS" which is commonly owned with the present application and the contents of which are incorporated herein by reference in its entirety. One or more collars 30*d* may be coupled to a corresponding section 28*a*, 28*b* of the vehicle component 12 and may be configured to removably couple connectors 21*a* of the electrical components 21 to the body 28 of the vehicle component 12. In the example illustrated, the collars 30*d* are coupled to the section 28*b* of the vehicle component 12 and may couple connectors 21*a* of the electrical components 21 to the section 28*b*. In this way, the connectors 21*a* are secured to the body 28 as the vehicle component 12 is moved from the part support (not shown) to the fixture 14 and as the section 28*b* is separated from the section 28*a* as described above. One example of such collar is disclosed in U.S. patent application Ser. No. 18/909,193, filed on Oct. 8, 2024, and titled "SYSTEM FOR HANDLING ELECTRICAL COMPONENTS" which is commonly owned with the present application and the contents of which are incorporated herein by reference in its entirety.

With reference to FIGS. 1 and 2, the fixture 14 is removably coupled to the work surface 16 (FIG. 1) such that the fixture 14 may be graspable by a robot (not shown). That is, the fixture 14 may be supported on one or more rails or beams that may be secured to the work surface 16 such that the fixture 14 is spaced apart from the work surface 16. In some forms, the fixture 14 may be removably coupled directly to the work surface 16. One example of the fixture 14 is disclosed in U.S. patent application Ser. No. 18/909,197, filed Oct. 8, 2024, and titled "METHOD AND SYSTEM FOR INSTALLING WIRING HARNESS INTO VEHICLE" which is commonly owned with the present application and the contents of which are incorporated herein by reference in its entirety.

Each module support 42 is secured to a corresponding section 28*a*, 28*b* of the fixture 14 and may be configured to retain a respective vehicle module 46*a*, 46*b*. In one example, the vehicle module 46*a*, 46*b* may be an engine control module that controls multiple systems of an internal combustion engine. In another example, the vehicle module 46*a*, 46*b* may be a suspension module that controls the suspension and adjust the tension for each wheel independently. It should be understood that the module supports 42 may support other vehicle modules for the machine without departing from the scope of the present disclosure.

Each module support 42 includes a structure or receptacle that the vehicle module 46*a*, 46*b* may be coupled thereto. A robot (not shown) may couple the vehicle module 46*a*, 46*b* to the module support 42 with little to no human intervention, thereby increasing productivity, and reducing cycle time, for example. In the example illustrated, the module supports 42 are secured to the fixture 14 (e.g., by fasteners). In other forms, one or more module supports 42 may be secured to one portion of the fixture 14 and one or more module supports 42 may be secured to another portion of the fixture 14. In this way, the vehicle modules 46*a*, 46*b* may be located at different locations and angles relative to each other along the fixture 14.

Figure 5A:
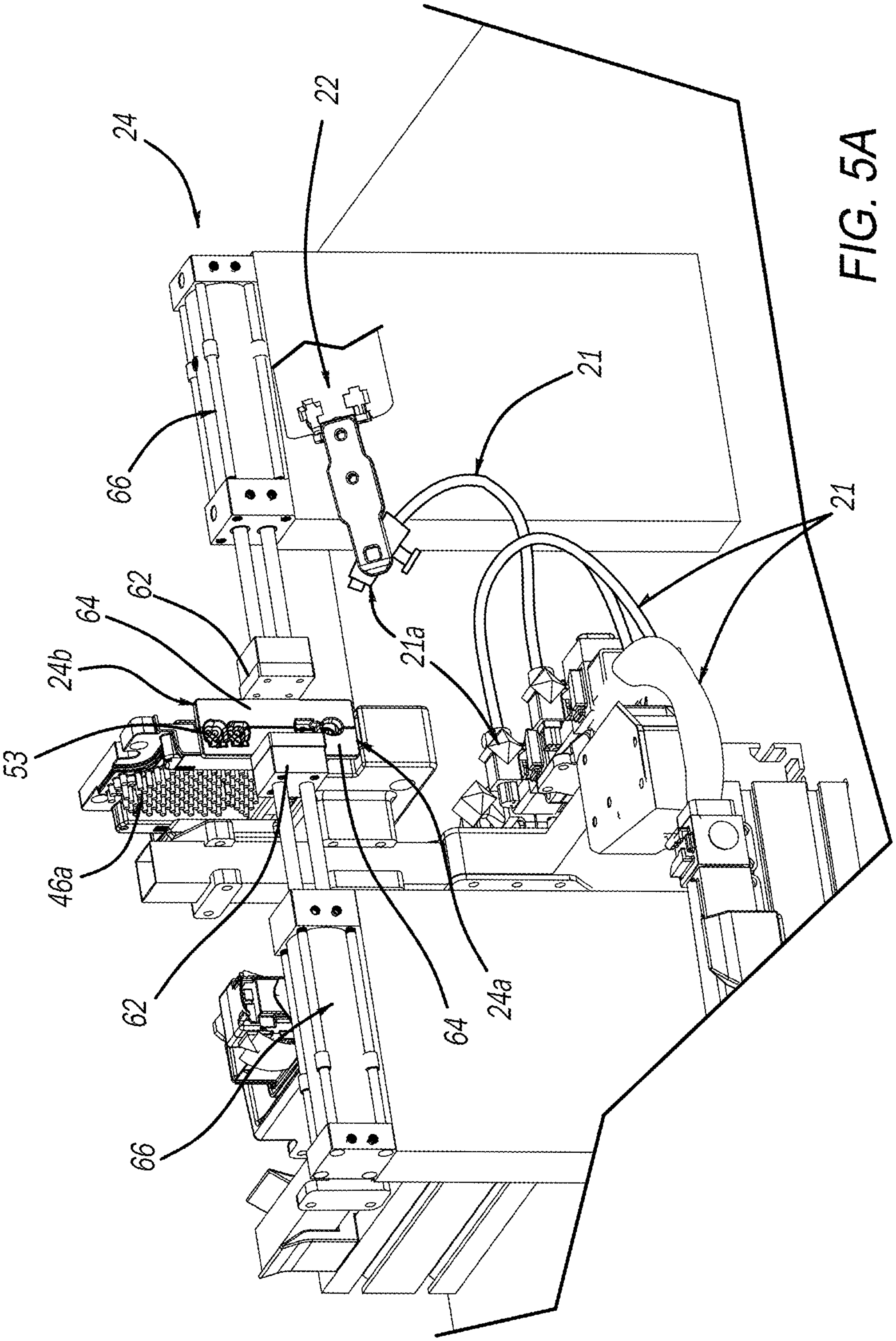
FIG. 5A is a perspective view of an electrical connector of the wire harness component of FIG. 1 being connected to a vehicle module component of the vehicle.
Figure 5B:
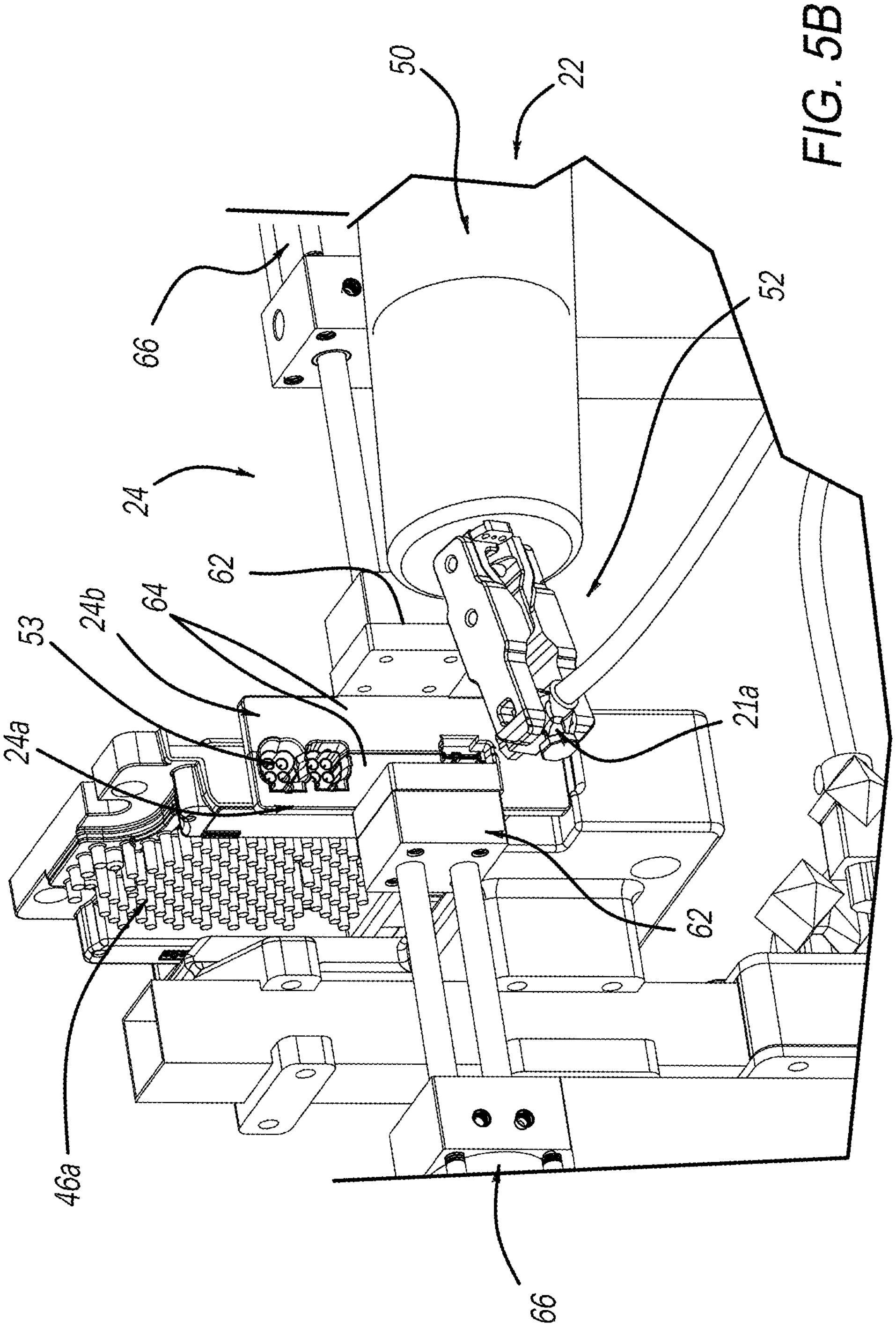
FIG. 5B is a perspective view of the electrical connector of the wire harness component of FIG. 1 connected to the vehicle module component of the vehicle.

With reference to FIGS. 1, 5A, 5B and 6, the robot 22 is configured to detach the sections 28*a*, 28*b* of the vehicle component 12 from each other on the work surface 16 and connect the connectors 21*a* of the electrical components 21 to terminals 53 of the vehicle modules 46*a*, 46*b* (FIGS. 5A and 5B). The robot 22 includes a robot arm 50 and a robotic gripper structure or apparatus 52. The robot arm 50 includes a plurality of segments connected to each other at joints, thereby allowing the robot 22 to have multiple degrees of freedom. The robot arm 50 is also secured to the work surface 16 at a first end. In some variations, the robot arm 50 includes an optional adapter (not shown) that is adapted to be secured to the work surface 16. In some forms, the robot 22 is separate from the work surface 16 and is partially or fully autonomous and is configured to autonomously move to the work surface 16 as instructed by the controller 26. To autonomously move itself, the controller 26 is configured to control various movement systems of the robot 22 based on location data obtained from one or more sensors. In an example application, the movement systems may include propulsion systems, and/or steering systems for controlling wheels, and the sensors for providing location data may include a GNSS sensor, an imaging sensor, a local position sensor, among others.

The robotic gripper structure 52 is secured to the robot arm 50 and is configured to grasp and move the sections 28*a*, 28*b* of the vehicle component 12. One example of such robotic gripper structure is disclosed in U.S. patent application Ser. No. 18/909,193, filed on Oct. 8, 2024, and titled "SYSTEM FOR HANDLING ELECTRICAL COMPONENTS" which is commonly owned with the present application and the contents of which are incorporated herein by reference in its entirety.

Another robot (not shown) is configured to move the fixture 14 and the vehicle component 12 from the work surface 16 to the machine, and couple the vehicle component 12 and the control modules 46*a*, 46*b* to the machine. That is, the robot engages the fixture 14 to move the fixture 14 and the vehicle components 12 coupled thereto from the work surface 16 to the machine. One example of such robot is disclosed in U.S. patent application Ser. No. 18/909,197, filed Oct. 8, 2024, and titled "METHOD AND SYSTEM FOR INSTALLING WIRING HARNESS INTO VEHICLE" which is commonly owned with the present application and the contents of which are incorporated herein by reference in its entirety.

Figure 3:
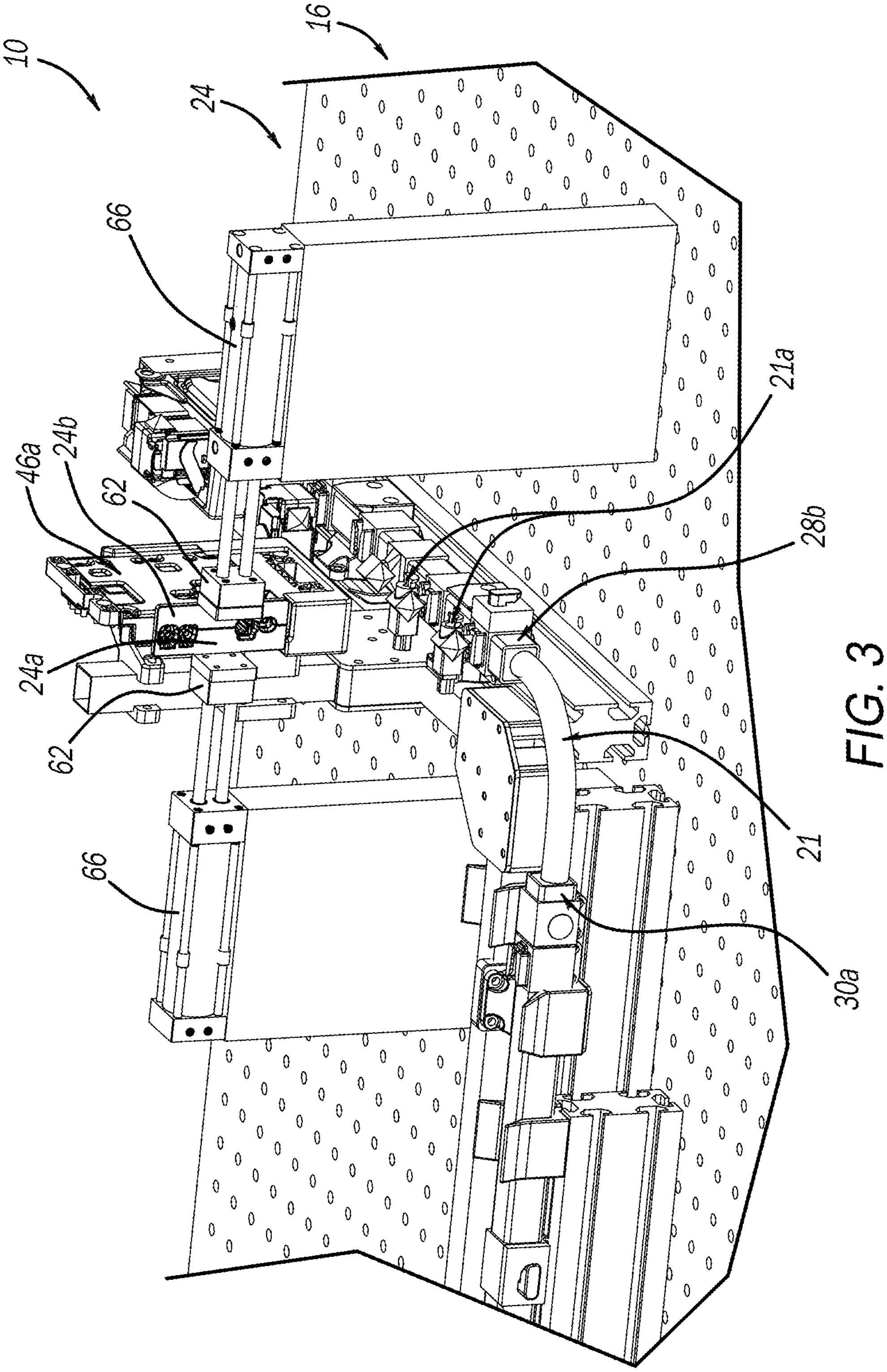
FIG. 3 is a perspective view of the system of FIG. 1 with the guiding apparatus of the system in a deployed position.
Figure 4A:
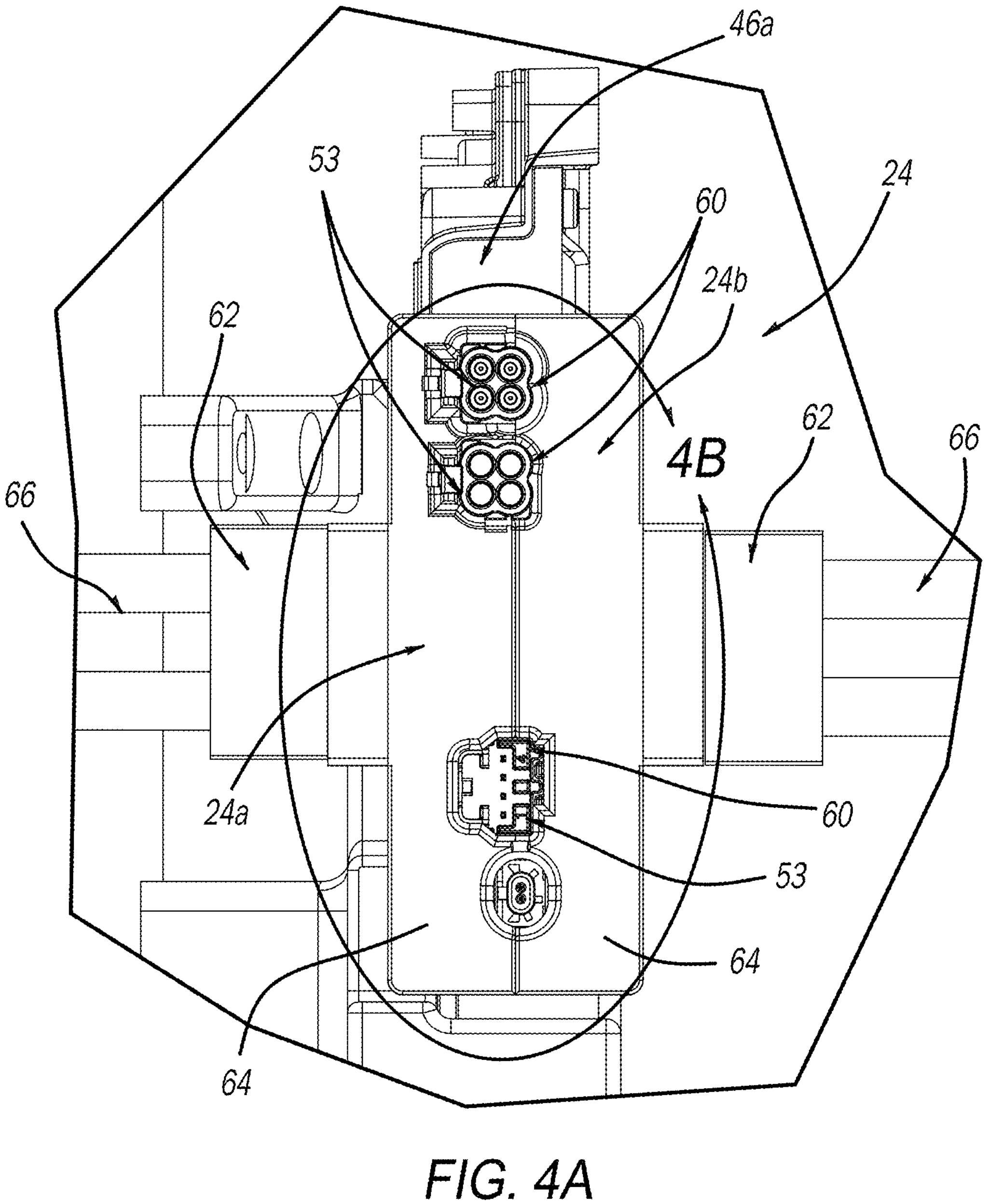
FIG. 4A is a front view of a portion of the guiding apparatus of FIG. 1 in the deployed position.

With reference to FIGS. 1, 3, and 4, the guiding apparatus 24 is secured to the work surface 16 and is movable between a first or stowed position (FIG. 1) in which the guiding apparatus 24 is disengaged with a respective vehicle module 46*a*, 46*b* and a second or deployed position (FIGS. 3 and 4) in which the guiding apparatus 24 is engaged with the respective vehicle module 46*a*, 46*b* to inhibit movement of the respective vehicle module 46*a*, 46*b*. The guiding apparatus 24 defines a plurality of openings 60 that include a shape the corresponds to the shape of the terminal 53 of the respective vehicle module 46*a*, 46*b*. The plurality of openings 60 also surround the terminals 53 in response to the guiding apparatus 24 being moved to the second position.

The guiding apparatus 24 may also be movable in a vertical direction relative to the work surface 16 and a horizontal direction relative to the work surface 16. In this way, the guiding apparatus 24 may be moved to different vehicle modules 46*a*, 46*b* coupled to the fixture 14 on the work surface 16. The guiding apparatus 24 includes a first member 24*a* and a second member 24*b*. The first member 24*a* and the second member 24*b* are spaced apart from each other when the guiding apparatus 24 is in the first position and engaged with each other to define the openings 60 when the guiding apparatus 24 is in the second position. Each of the first and second members 24*a*, 24*b* includes a mounting section 62 and a module section 64. An actuator assembly 66 is coupled to a respective mounting section 62 of the first and second members 24*a*, 24*b* via fasteners, for example, and is configured to move the guiding apparatus 24 between the first position and the second position. The actuator assembly 66 may be an electric motor, an air cylinder, a hydraulic motor, or any other suitable actuator that is allowed to move the first and second members 24*a*, 24*b*.

Figure 4B:
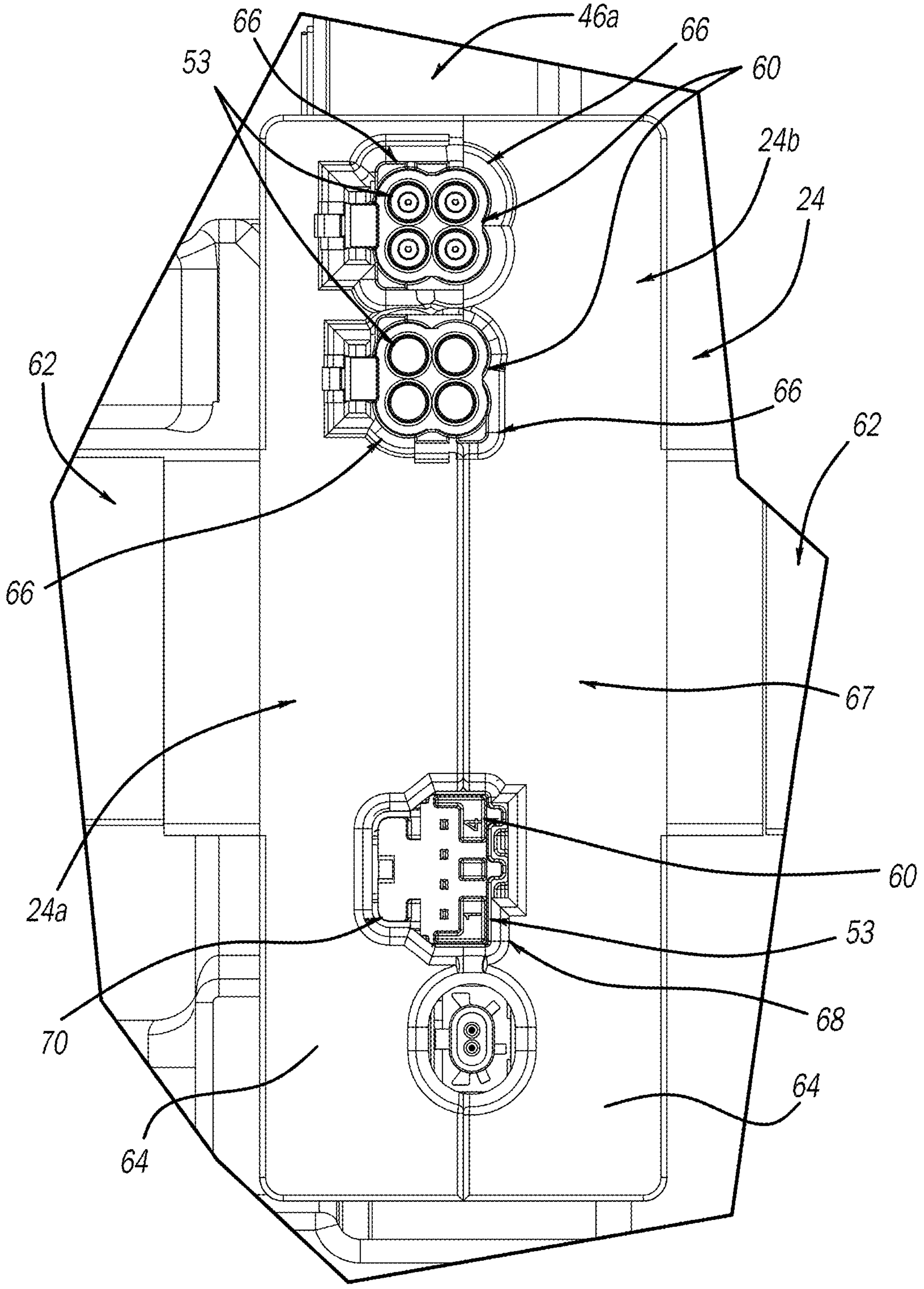
FIG. 4B is a close-up view of the area indicated as 4B of FIG. 4A.

As shown in FIG. 4B, the module section 64 includes a plurality of cutouts 66 at a periphery thereof. When the guiding apparatus 24 is moved to the second position, the first and second members 24*a*, 24*b* engage each other to define a plate 67 and the cutouts 66 of the first and second members 24*a*, 24*b* cooperate with each other to define the plurality of openings 60. Each opening 60 defines an insertion region 68 that opens through a first side of the plate 67 and a connecting region 70 that opens through a second side of the plate 67 that is opposite the first side. The insertion region 68 has an area that is greater than an area of the connecting region 70. Stated differently, the openings 60 narrow from the insertion region 68 toward the connecting region 70. Thus, when each connector 21*a* is being connected to a respective terminal 53, the connector 21*a* is inserted through a respective opening 60 where it is guided from the insertion region 68, through the connecting region 70 and to the respective terminal 53. In this way, the guiding apparatus 24 may accommodate error or misalignment in the connector 21*a* initial positioning by the robot 22.

With reference to FIG. 6, the controller 26 is in communication with the robot 22, the actuator assembly 66, and the guiding apparatus 24 and may monitor and control operations of the robot 22, the actuator assembly 66, and the guiding apparatus 24 based on data received. In one example, the controller 26 is in communication with the robot 22, the actuator assembly 66, and the guiding apparatus 24 using a wired or wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others).

Figure 7:
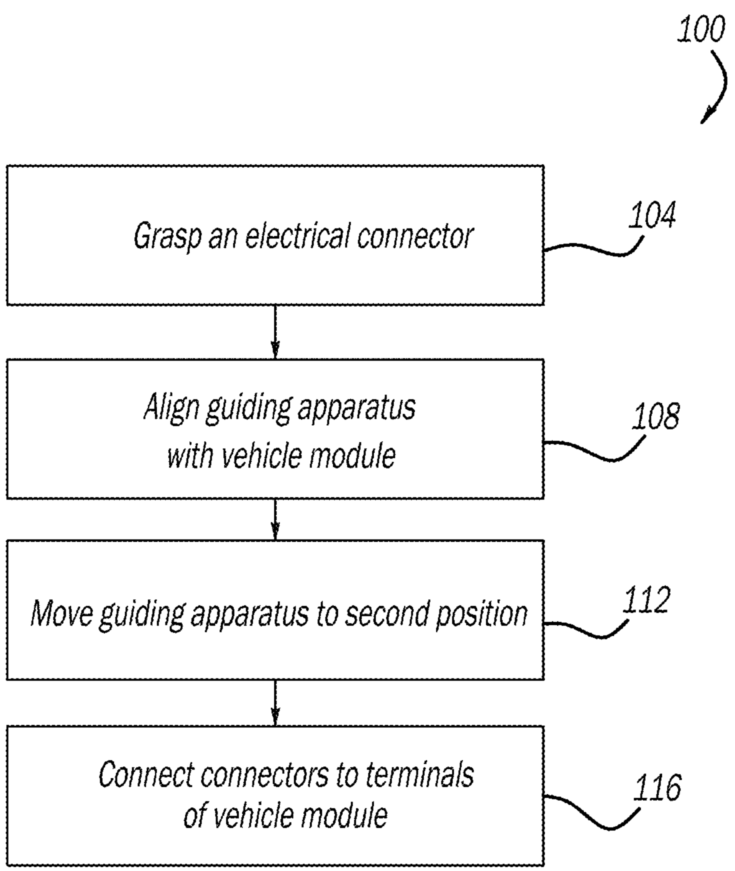
FIG. 7 is a flowchart depicting an algorithm for handling components of the system of FIG. 1 in accordance with the teachings of the present disclosure.
Figure 8:
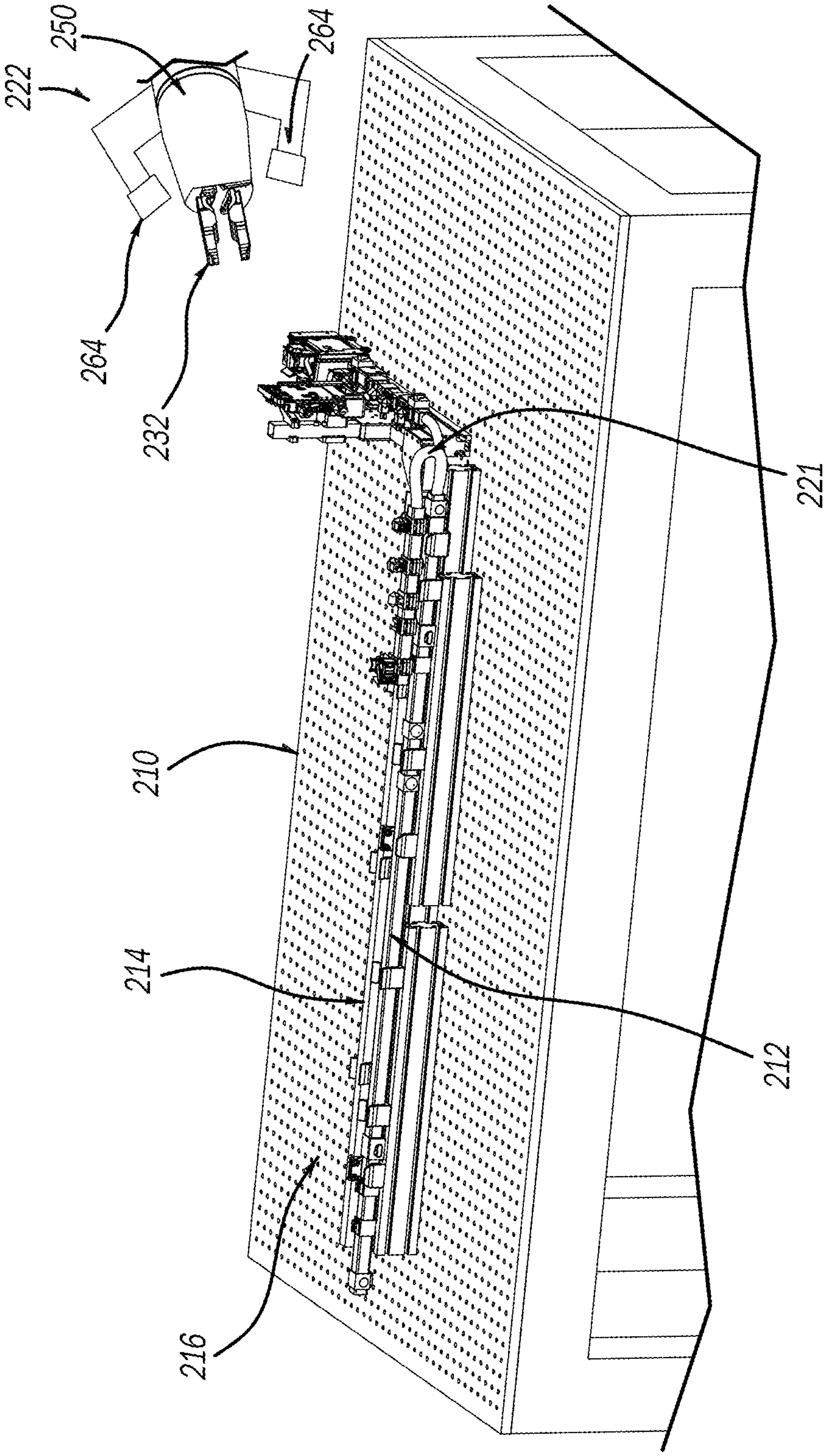
FIG. 8 is a perspective view of another system for handling components of a vehicle according to the principles of the present disclosure.

Referring to FIG. 7, an example control algorithm 100 for connecting the connectors 21*a* of the vehicle component 12 to the terminals 53 of respective modules 46*a*, 46*b* is illustrated. The processing may begin once the vehicle component 12 is moved from the part support (not shown) to the fixture 14 and the vehicle modules 46*a*, 46*b* are coupled to the fixture 14 as described above. At 104, the control algorithm, using the controller 26, instructs the robot 22 to grasp one of the electrical connectors 21*a* of the vehicle component 12 based on data received. The data may be one or more sensors (not shown) that detect when the vehicle component 12 is coupled to the fixture 14 and/or one or more sensors that detect when the vehicle modules 46*a*, 46*b* are coupled to the fixture 14, for example.

At 108, the control algorithm, using the controller 26, instructs the guiding apparatus 24 to align with a respective vehicle module 46*a*, 46*b*. That is, the guiding apparatus 24 may move relative to the work surface 16 via a motor, for example, to horizontally and vertically align with the respective vehicle module 46*a*, 46*b*. At 112, the control algorithm, using the controller 26, instructs the guiding apparatus 24 to move to the second position. In this way, the openings 60 formed by the plate 67 of the first and second members 24*a*, 24*b* surround the terminals 53 of the respective vehicle module 46*a*, 46*b* and the plate 67 holds and retains the respective vehicle module 46*a*, 46*b* in position (e.g., a known position).

At 116, the control algorithm, using the controller 26, instructs the robot 22 to grasp each connector 21*a* and connect the connector 21*a* to a terminal 53 of the respective vehicle module 46*a*, 46*b*. Each connector 21*a* extends through a respective opening 60 of the guiding apparatus 24 as it is being connected to the terminal 53. The vehicle module 46*a*, 46*b* being held in place using the plate 67 while the connectors 21*a* are connected to the terminals 53 provides that the connectors 21*a* are properly connected to the terminals 53 with a high level of precision while still being able to accommodate for error or misalignment.

After the robot 22 connects each connector 21*a* to the terminal 53 of the respective vehicle module 46*a*, 46*b*, the guiding apparatus 24 is moved to another vehicle module 46*a*, 46*b* associated with the fixture 14 where the process is repeated (i.e., the guiding apparatus 24 holds the other vehicle module 46*a*, 46*b* while connectors 21*a* of the vehicle component 12 are connected to the vehicle module 46*a*, 46*b*). Once all the connectors 21*a* are connected to the terminals 53 of the vehicle modules 46*a*, 46*b*, the fixture 14, the vehicle modules 46*a*, 46*b*, and the vehicle component 12 form a rigid structure. The robot (not shown) may move the rigid structure to the machine. In this way, the parts (e.g., connectors 21*a*, the vehicle modules 46*a*, 46*b*, the vehicle component 12, the fixture 14) of the rigid structure are held in place during movement of the rigid structure to the machine. That is, the rigid structure is formed at the work surface 16 that may be remote (e.g., at a different location) from the final vehicle assembly line where the machine is located. In this way, the rigid structure may be built up off the final vehicle assembly line and then moved to the machine on the final vehicle assembly line. The buildup of the electrical connectors 21*a* and the vehicle modules 46*a*, 46*b* onto the fixture 14 offline allows for longer cycle times for each robotic operation, thereby providing the use of smaller robots. The buildup of the electrical connectors 21*a* and the vehicle modules 46*a*, 46*b* onto the fixture 14 offline also allows for verification of the electrical connections offline, thereby inhibiting rework on the final vehicle assembly line. The buildup of the electrical connectors 21*a* and the vehicle modules 46*a*, 46*b* onto the fixture 14 offline further inhibits the electrical connectors 21*a* from being entangled with features and parts on the machine.

With reference to FIGS. 8-11, another system 210 for handling vehicle components 212 is illustrated. The structure and function of the system 210 may be similar or identical to the system 10 described above, apart from the exceptions noted below.

Figure 10:
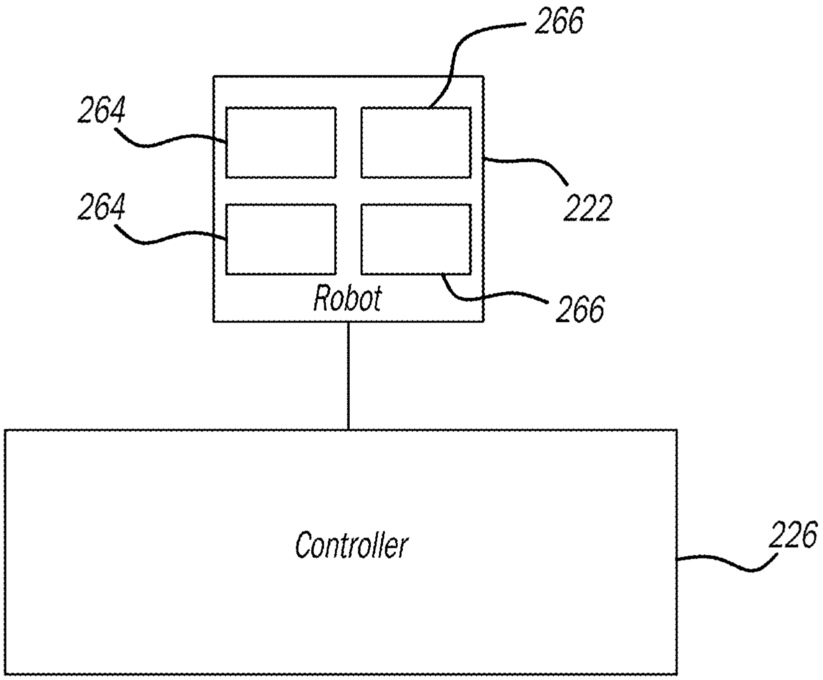
FIG. 10 is a schematic block diagram showing components of the system of FIG. 8 in accordance with the teachings of the present disclosure.

The system 210 may include the vehicle components 212 (only one shown in the figures), a fixture 214, one or more robots 222, and a controller 226 (FIG. 10). The structure and function of the vehicle components 212 and the fixture 214 may be similar or identical to the vehicle components 12 and the fixture 14, respectively, described above, and therefore, will not be described again in detail.

The robot 222 is configured to detach the sections of the vehicle component 212 from each other on the work surface 216 and connect the connectors 221*a* of the electrical components 221 to terminals 253 of vehicle modules 246*a*, 246*b*. The robot 222 includes a robot arm 250, a robotic gripper structure or apparatus 252, and vision sensors 264. The structure and function of the robot arm 250 may be similar or identical to the robot arm 50 described above, and therefore, will not be described again in detail. The structure and function of the robotic gripper structure 252 may be similar or identical to the robotic gripper structure 52 described above, and therefore, will not be described again in detail.

Figure 9A:
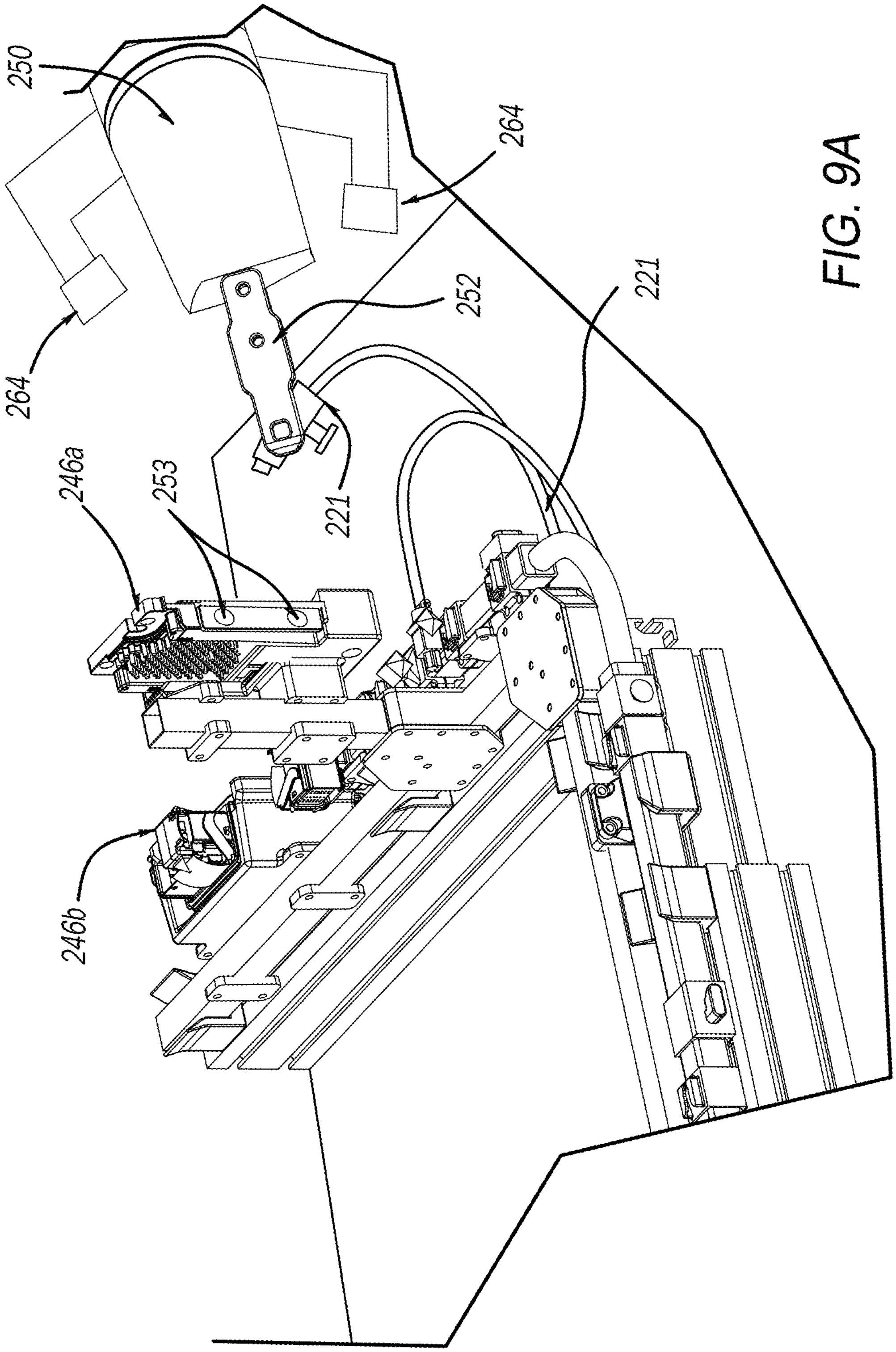
FIG. 9A is a perspective view of a robot of the system of FIG. 8 grasping an electrical connector of a wire harness component of the system of FIG. 8.
Figure 9B:
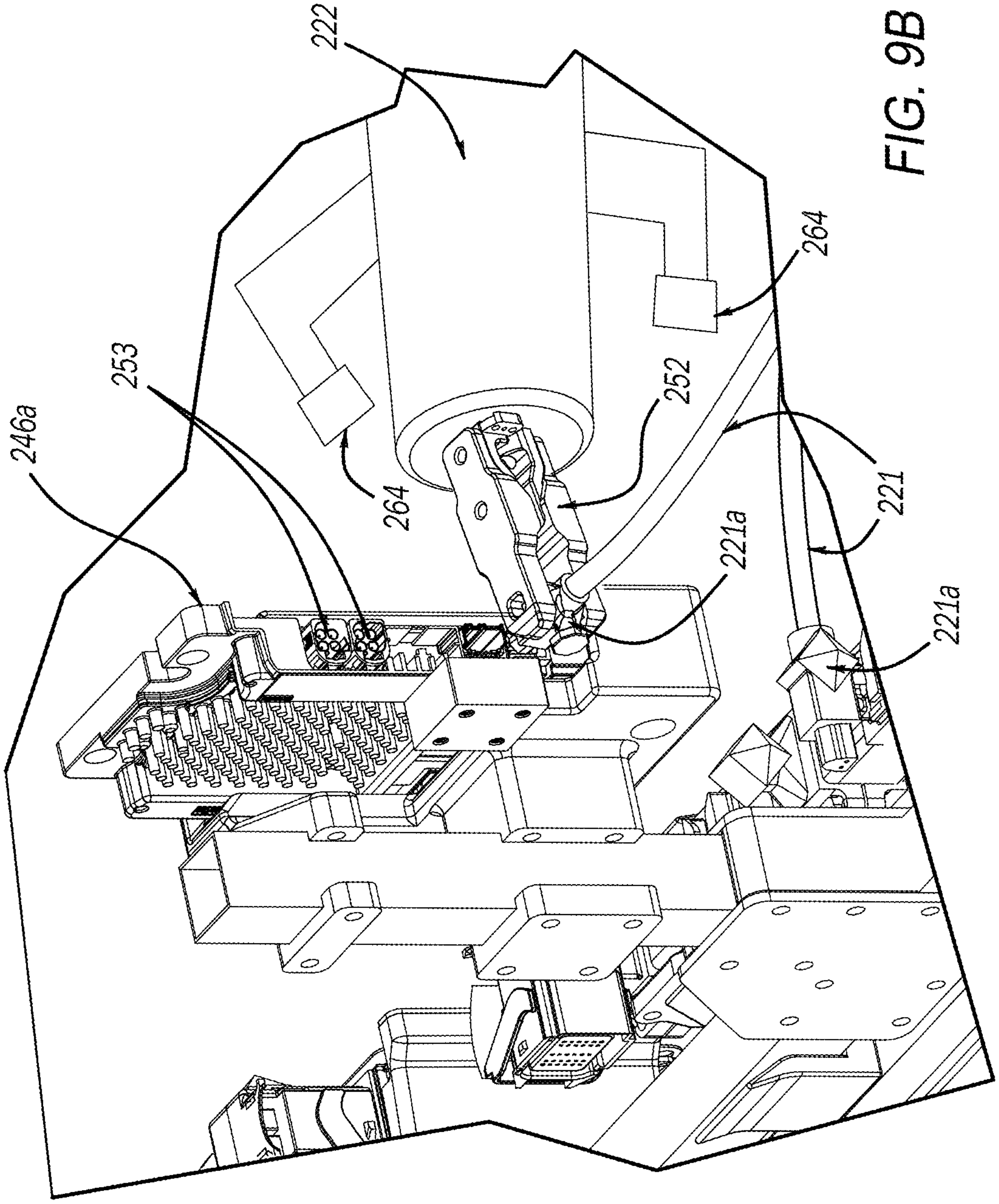
FIG. 9B is a perspective view of the robot of the system of FIG. 8 connecting the electrical connector of the wire harness component of FIG. 8 to a vehicle module component.

With reference to FIGS. 9A, 9B and 10, the vision sensors 264 are disposed on the robot arm 250 or gripper structure 252 and may be in communication with the controller 226 using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others). Each vision sensor 264 collects visual image data and transmits the data to the controller 226. Based on the visual image data, the controller 226 provides instructions to the robot 222 to operate the robot 222. More specifically, the controller 226 provides instructions to operate the robot 222 to grasp the electrical connector 221*a* and connect it to the terminal 253 of the vehicle module 246*a*, 246*b*.

In one form, the vision sensors 264 are configured with an object detection algorithm trained to identify the electrical connector 221*a* and the terminal 253 based on images collected by the vision sensors 264. The object detection algorithm is an image processing technique, such as Canny edge detection or deep learning. In another form, the controller 226 is configured with the object detection algorithm and, based on data from a localization system (not shown), locates the connectors 221*a* on the vehicle component 12 and the terminals 253 on the vehicle module 246*a*, 246*b* based on the image data. In one form, the visual image data includes coordinate data, such as two-dimensional or three-dimensional coordinate data, that the localization system is configured to process into a global coordinate system. Based on the localizing performed by the localization system, the controller 226 is configured to identify objects and locations of objects in the visual image data.

The system 210 may further includes sensors 266 (FIG. 10). The sensors 266 may be associated with the robot 222, for example, and may be in communication with the controller 226 using a wireless communication protocol (e.g., a Bluetooth®-type protocol, a cellular protocol, a wireless fidelity (Wi-Fi)-type protocol, a near-field communication (NFC) protocol, an ultra-wideband (UWB) protocol, among others). Each sensor 266 measures force or pressure applied to the robot 222 and transmits the data to the controller 226. Based on the force or pressure data, the controller 226 provides instructions to the robot 222 to operate the robot 222.

Figure 11:
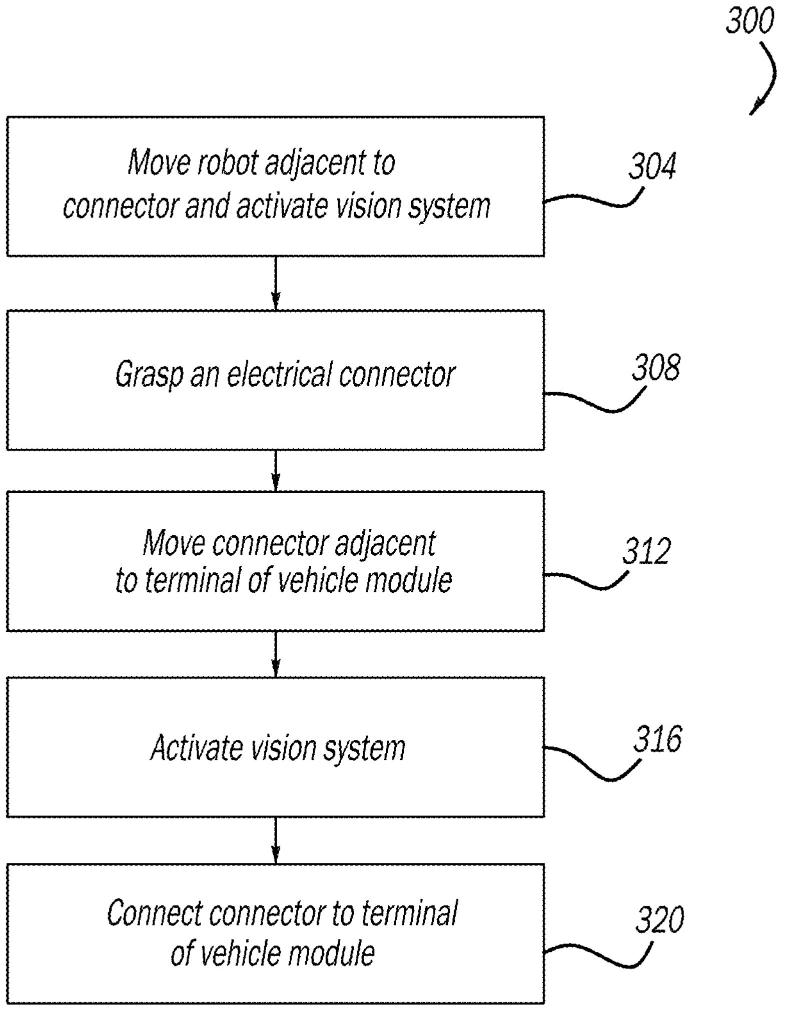
FIG. 11 is a flowchart depicting an algorithm for handling components of the system of FIG. 8 in accordance with the teachings of the present disclosure.

Referring to FIG. 11, an example control algorithm 300 for connecting the connectors 221*a* of the vehicle component 212 to the terminals 253 of respective modules 246*a*, 246*b* is illustrated. The processing may begin once the vehicle component 212 is moved from the part support (not shown) to the fixture 214 and the vehicle modules 246*a*, 246*b* are coupled to the fixture 214 as described above. At 304, the control algorithm, using the controller 226, instructs the robot 222 to move adjacent to one of the electrical connectors 221*a* and activate the vision system 264 to locate the precise location of the electrical connector 221*a* on the vehicle component 212. At 308, the control algorithm, using the controller 226, instructs the robot 222 to grasp the one electrical connector 221*a* of the vehicle component 212 based on data received from the vision sensors 264.

At 312, the control algorithm, using the controller 226, instructs the robot 222 to move the connector 221*a* adjacent to one of the terminals 253 of a respective module 246*a*, 246*b*. At 316, the control algorithm, using the controller 226, activates the vision system 264 to locate the precise location of the terminal 253 on the vehicle module 246*a*, 246*b*. In some forms, the robot 222 may also touch one or more surfaces of the respective module 246*a*, 246*b* and transmit the data to the controller 226. Based on the force or pressure data, the controller 226 may provide further instructions to the robot 222 of the precise location of the terminal 253 of the vehicle module 246*a*, 246*b*. At 320, the control algorithm, using the controller 226, instructs the robot 222 to connect the connector 221*a* to the terminal 253 of the respective vehicle module 246*a*, 246*b*.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

In this application, the term "controller" and/or "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A system for handling electrical components of a vehicle, the system comprising:

a fixture including at least one module coupled thereto, the at least one module including a first terminal;

a vehicle component coupled to the fixture and including a first electrical connector;

at least one robot;

a guiding apparatus movable between a first position in which the guiding apparatus is disengaged with the at least one module and a second position in which the guiding apparatus is engaged with the at least one module to inhibit movement of the at least one module, the guiding apparatus defines a first opening that includes a shape that corresponds to the shape of the first terminal of the at least one module, the first opening surrounds the first terminal in response to the guiding apparatus being moved to the second position; and a controller in communication with the at least one robot and the guiding apparatus, the controller configured to:

instruct the at least one robot to grasp the first electrical connector based on the vehicle component being coupled to the fixture;

move the guiding apparatus to the second position; and instruct the at least one robot to connect the first electrical connector to the first terminal of the at least one module, the first electrical connector extending through the first opening of the guiding apparatus to connect to the first terminal.

2. The system of claim 1, wherein the controller is configured to move the guiding apparatus from the second position to the first position in response to the first electrical connector being connected to the first terminal.

3. The system of claim 1, wherein the guiding apparatus includes a first member and a second member, and wherein the first member and the second member are spaced apart from each other when the guiding apparatus is in the first position and engaged with each other to define the first opening when the guiding apparatus is in the second position.

4. The system of claim 3, further comprising an actuator assembly coupled to the guiding apparatus and configured to move the guiding apparatus between the first position and the second position.

5. The system of claim 1, wherein the vehicle component includes a rigid wire harness body, and wherein the first electrical connector is coupled to the rigid wire harness body prior to the at least one robot grasping the first electrical connector.

6. The system of claim 1, wherein the at least one module is removably coupled to the fixture.

7. The system of claim 1, wherein the vehicle component includes a rigid wire harness body and a collar secured to the rigid wire harness body, and wherein the first electrical connector is coupled to the collar prior to the at least one robot grasping the first electrical connector.

8. The system of claim 1, wherein:

the at least one module includes a second terminal; and the guiding apparatus defines a second opening that includes a shape that corresponds to the shape of the second terminal of the at least one module, the second opening surrounds the second terminal in response to the guiding apparatus being moved to the second position.

9. The system of claim 8, wherein:

the vehicle component includes a second electrical connector;

the controller is configured to instruct the at least one robot to connect the second electrical connector to the second terminal of the at least one module after the first electrical connector is connected to the first terminal, the second electrical connector extends through the second opening of the guiding apparatus to connect to the second terminal.

10. The system of claim 1, wherein the at least one module includes a plurality of modules.

11. The system of claim 1, wherein the at least one module includes a plurality of modules.

12. A system for handling electrical components of a vehicle, the system comprising:

a fixture including at least one module coupled thereto, the at least one module including a first terminal;

a vehicle component coupled to the fixture to form a structure, the vehicle component includes a first electrical connector;

at least one robot;

a guiding apparatus movable between a first position in which the guiding apparatus is disengaged with the at least one module and a second position in which the guiding apparatus is engaged with the at least one module to inhibit movement of the at least one module, the guiding apparatus defines a first opening that includes a shape that corresponds to the shape of the first terminal of the at least one module, the first opening surrounds the first terminal in response to the guiding apparatus being moved to the second position and comprises an insertion region and an connecting region, the insertion region having an area that is greater than an area of the connecting region; and a controller in communication with the at least one robot and the guiding apparatus, the controller configured to:

instruct the at least one robot to grasp the first electrical connector based on the vehicle component being coupled to the fixture;

move the guiding apparatus to the second position; and instruct the at least one robot to connect the first electrical connector to the first terminal of the at least one module, the first electrical connector extending through the first opening of the guiding apparatus to connect to the first terminal.

13. The system of claim 12, wherein the insertion region narrows toward the connecting region.

14. The system of claim 12, wherein the at least one robot includes a first robot and a second robot, and wherein the first robot connects the first electrical connector to the first terminal and the second robot moves the structure after the first robot connects the first electrical connector to the first terminal.

15. The system of claim 12, wherein the controller is configured to move the guiding apparatus from the second position to the first position in response to the first electrical connector being connected to the first terminal.

16. The system of claim 12, wherein the guiding apparatus includes a first member and a second member, and wherein the first member and the second member are spaced apart from each other when the guiding apparatus is in the first position and engaged with each other to define the first opening when the guiding apparatus is in the second position.

17. The system of claim 16, further comprising an actuator assembly coupled to the guiding apparatus and configured to move the guiding apparatus between the first position and the second position.

18. The system of claim 12, wherein the vehicle component includes a rigid wire harness body, and wherein the first electrical connector is coupled to the rigid wire harness body prior to the at least one robot grasping the first electrical connector.

19. The system of claim 12, wherein the vehicle component includes a rigid wire harness body and a collar secured to the rigid wire harness body, and wherein the first electrical connector is coupled to the collar prior to the at least one robot grasping the first electrical connector.

20. A system for handling electrical components of a vehicle, the system comprising:

a fixture including a plurality of modules coupled thereto, each module including a first terminal and a second terminal;

a vehicle component coupled to the fixture to form a structure, the vehicle component including a rigid wire harness body, a first electrical connector, and a second electrical connector, the first and second electrical connectors coupled to the rigid wire harness body;

at least one robot;

a guiding apparatus movable between a first position in which the guiding apparatus is disengaged with one of the plurality of modules and a second position in which the guiding apparatus is engaged with the one of the plurality of modules to inhibit movement of the one of the plurality of modules, the guiding apparatus defines a first opening and a second opening each including a shape that corresponds to a shape of the first terminal and the second terminal, the first opening surrounds the first terminal in response to the guiding apparatus being moved to the second position and the second opening surrounds the second terminal in response to the guiding apparatus being moved to the second position, each of the first and second openings comprises an insertion region and an connecting region, the insertion region having an area that is greater than an area of the connecting region; and a controller in communication with the at least one robot and the guiding apparatus, the controller configured to:

instruct the at least one robot to grasp the first electrical connector based on the vehicle component being coupled to the fixture;

move the guiding apparatus to the second position;

instruct the at least one robot to connect the first electrical connector to the first terminal, the first electrical connector extending through the first opening of the guiding apparatus to connect to the first terminal;

instruct the at least one robot to grasp the second electrical connector;

instruct the at least one robot to connect the second electrical connector to the second terminal, the second electrical connector extending through the second opening of the guiding apparatus to connect to the second terminal;

move the guiding apparatus from the second position to the first position in response to the first electrical connector being connected to the first terminal and the second electrical connector being connected to the second terminal; and instruct the at least one robot to move the structure after the first electrical connector is connected to the first terminal and the second electrical connector is connected to the second terminal.

* * * * *